United States Patent [19]
Verret

[11] Patent Number: 5,435,910
[45] Date of Patent: Jul. 25, 1995

[54] EMULSION BREAKING SYSTEM FOR OFFSHORE FACILITIES

[75] Inventor: Allen J. Verret, Abita Springs, La.
[73] Assignee: Texaco Inc., White Plains, N.Y.
[21] Appl. No.: 326
[22] Filed: Jan. 4, 1993
[51] Int. Cl.⁶ .......................................... B01D 17/028
[52] U.S. Cl. ..................................... 210/86; 210/97; 210/170; 210/248; 210/257.1; 210/521
[58] Field of Search ................ 210/86, 97, 110, 104, 210/117, 170, 519, 708, 709, 744, 747, 248, 257.1, 521; 166/53, 267

[56] References Cited

U.S. PATENT DOCUMENTS

| | | | |
|---|---|---|---|
| 3,893,918 | 7/1975 | Favret | 210/104 |
| 4,031,007 | 6/1977 | Sierra | 210/86 |
| 4,428,841 | 1/1984 | Favret | 210/170 |
| 4,431,534 | 2/1984 | Gordon | 210/110 |
| 4,816,146 | 3/1989 | Schertler | 210/104 |
| 5,149,344 | 9/1992 | Macy | 210/104 |
| 5,248,439 | 9/1993 | Derrell | 210/747 |
| 5,286,383 | 2/1994 | Verret et al. | 210/540 |
| 5,330,651 | 7/1994 | Robertson et al. | 210/747 |
| 5,340,477 | 8/1994 | Simon | 210/248 |

FOREIGN PATENT DOCUMENTS

| | | | |
|---|---|---|---|
| 59-206012 | 11/1984 | Japan | 210/86 |
| 2236688 | 4/1991 | United Kingdom | 210/110 |

*Primary Examiner*—Joseph W. Drodge
*Attorney, Agent, or Firm*—Kenneth R. Priem; William J. Beard

[57] ABSTRACT

An aqueous emulsion accumulating and breaking system for an offshore drilling or hydrocarbon producing platform, located at an offshore operating site. The system is comprised of a primary emulsion separator, which receives untreated aqueous emulsion and includes a hydrocarbon component, and further includes an emulsion accumulating system of conductors which collect rainwater and discharge it into the separator or to a secondary accumulating tank. A control system in the emulsion separator includes a liquid level monitor, which activates a flow regulating valve at the separator inlet to adjust the influx of the aqueous emulsion as a function of the emulsion level within the separator.

2 Claims, 1 Drawing Sheet

EMULSION BREAKING SYSTEM FOR OFFSHORE FACILITIES

BACKGROUND OF THE INVENTION

In any offshore installation for producing crude oil from a substrate beneath the sea floor, the produced flow will normally comprise an emulsion of crude oil and water, together with an amount of particulate material such as sand or the like. To facilitate handling of this emulsion, rather than pumping it immediately ashore it is subjected to an on-site separation procedure.

Among the most economical and simple ways to achieve the separation or breaking of an emulsion of this type is through a gravity separator unit, a method which allows the lighter crude oil to rise to the surface of the water. The heavier solid materials will gravitate through the water to accumulate on the separator floor.

After separation has been achieved, the crude oil is retained and stored for shipment or is pumped to a shore-based installation. The water is disposed of through a disposal downcomer or pile, which in effect discharges it overboard.

With the inception of governmental rules and regulations for preserving the integrity of the environment, great care must be exercised. While discharging this water, even minute amounts of crude oil must not go along with it. The presence of the crude oil is readily detected by a discoloration on the water's surface which, as it spreads about the platform or the drilling vessel, will create a noticeable sheen.

The normal procedure for achieving the desired separation is as noted, by introducing the emulsion to a large enough separator so that a quiescent or lengthy separation of the two liquids can take place. An apparatus of this type is normally designed large enough to accommodate the anticipated flow of produced material. Thus, the separator's capacity is generally adequate, although limited to a predetermined rate of flow.

A problem introduced into this type of separating apparatus occurs when an excessive and uncontrollable flow of water enters the unit. Such a situation is normally created when a large amount of rain, as would be experienced during a severe rainstorm, a hurricane or the like. The accumulated rainwater, in running through the various decks of the offshore platform, will pick up and accumulate a certain amount of light debris.

When this excessive flow of water eventually reaches the separator at the platform's lower deck, the latter is often strained to keep up the separation process. The outcome is that the water eventually overflows the separator, carrying with it amounts of crude oil, both of which are washed overboard.

BRIEF STATEMENT OF THE INVENTION

To overcome or obviate the above-stated problem, there is hereinafter disclosed an emulsion separator which is capable of accommodating an excessive flow of water, particularly rainwater, along with an amount of crude oil such that the two insoluble components can be readily dealt with.

The unit includes means for not only separating or breaking the emulsion into heavier and lighter components, it also allows for upward movement of the light or hydrocarbon component to a weir or overflow compartment. Here it can be removed through a multi-level discharge facility.

It is, therefore, an objective of the invention to provide an emulsion-breaking apparatus, particularly for use at an offshore platform. A further object is to provide an apparatus which is adapted to not only separate an aqueous emulsion into its insoluble liquid components, but also to allow for an excessive flow of the water component which would occur in the instance of excessive rain fall on the platform.

DRAWINGS

Figure 1:
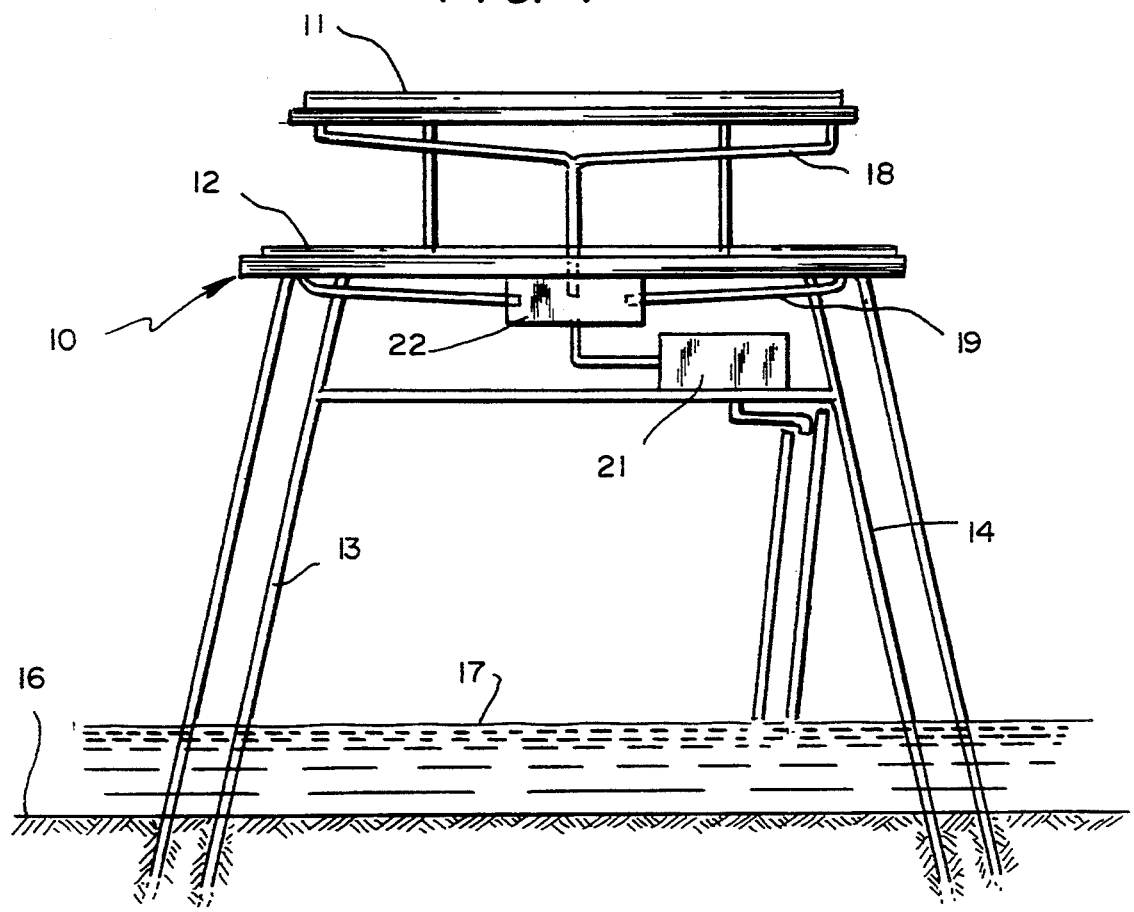
FIG. 1 is an elevation view of the subject separator as used on an offshore structure.

Referring to the drawings, the emulsion collector and separator system is illustrated in FIG. 1 on an offshore producing platform (10) of the type which is normally at a working site, either for drilling or for producing crude oil from a subterranean reservoir. Platform (10) includes major components comprised of a series of vertically spaced decks (11) and (12), which house the equipment and the needed supplies for the producing operation.

Platform (10) can include any number of decks, together with support legs (13) and (14) which are embedded into the ocean floor (16) and which support the decks a predetermined height above the water surface (17).

If the rainwater does not become tainted due to contact with oily parts of platform (10) it can be passed directly back into the adjacent body of water. However, experience has taught that a considerable amount of the water will fall onto the various decks (11) and (12) and in draining, will accumulate and pick up not only particulate material, but also a certain amount of crude oil, lubricant and the like. This results from the water flowing along the decks and other surfaces that have previously been in contact with the oily product.

The drain system for catching rain water at each deck level includes a plurality of conductors or open conduits (18) and (19) placed strategically about the various decks. The respective conduits are interconnected to carry rain water and aqueous emulsion from one deck, downwardly to the next deck beneath, and thereafter to a main emulsion separator (21).

The rain carrying conduits (18) and (19) include an appropriate network or system for each deck which system can be directed downward to separator (21) or it can be interconnected through a conductor arrangement to the next lower deck level.

To avoid or at least minimize the possibility of overflow as lower drain conductors become filled or overloaded means can be provided for accumulating drained water into a closed secondary or holding tank (22), which is preferably positioned adjacent to main separating tank (21) or at an equivalently low level.

In any instance, the rain water collecting system is so dispersed as to receive rain water which drains from each deck level in a manner to avoid flowing from the decks and into the surrounding waters. The drain conductors (18 and 19) should be of adequate size and disposition to avoid unnecessary blockages from occurring which could result from a backup of the rainwater. Should such a condition persist, it could cause water to flow backward from the platform and into the surrounding water.

To facilitate the emulsion collection phase, if need be, secondary tank (22) can be placed adjacent to the main separating tank (21) such that the latter can be assured of a continuous flow of oil-polluted emulsion. During every severe rainfall there will be a relatively rapid flow of water from the upper decks to the lower. There would however, be scant opportunity for the aqueous emulsion to accumulate at any one static spot and commence to separate into its discreet components.

Figure 2:
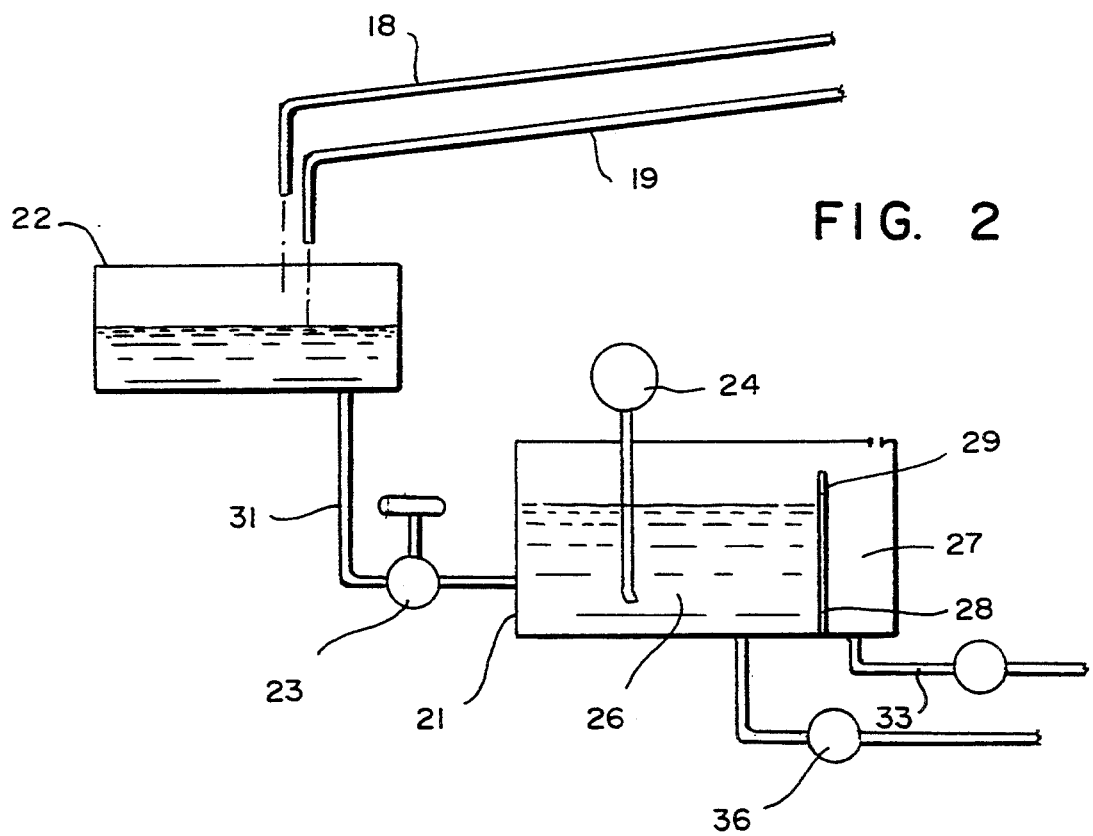
FIG. 2 is a schematic view of the apparatus on an enlarged scale.

Referring to FIG. 2, main separator (21) is communicated with the drain system as noted, directly through the conductor network or through secondary holding tank (22). However, communication between separator (21) and the drain system is regulated by an inlet or overflow control valve (23). This valve is adapted to function between open and closed positions in response to a mechanical or electrical signal transmitted thereto from a sensing means (24).

Structurally, separator (21) is of the type normally used in installations where large quantities of emulsion are separated by gravity. It is comprised preferably of a large, open or closed tank which is divided internally into a plurality of compartments.

Emulsion separator or main separating tank (21) is comprised generally of an elongated member which is partitioned internally into a primary emulsion settling chamber (26) and a secondary or receiving chamber (27). The tank is preferably elongated in shape having opposed sides as well as end panels with a floor and an optional cover to define a closed container. Internally, a central panel (28) extends crossways of the separator to define said primary and secondary chambers. Central panel (28) includes a weir (29) formed along at least a portion of said panel's upper edge across which a floating layer of emulsion will pass to fall into secondary chamber (27).

An inlet (31) at one end of primary chamber (26) is connected by way of an inlet conduit (32) to a flow control or overflow valve (23). Thus, emulsion which is directed into primary chamber (26) will fill the later to a normal operating height which terminates at the weir (29) edge. As emulsion flows from inlet (31) toward weir (29), the lighter hydrocarbon component will rise through the heavier water and be skimmed across the top edge of the weir into the secondary chamber (27). A discharge port (33) communicated with secondary chamber (27) conducts a stream of the oil or hydrocarbon component to means for further processing same.

Primary chamber (26) is provided with a similar discharge port (34) adjacent to the weir panel (28), such that water which has accumulated in said primary chamber can be drained off. Water discharge port (34) can be further provided with a valve (36) adjustable for regulating the flow of water from chamber (26) for normal operations other than those imposed in an overloaded condition. As a further safety measure, the flow of water through valve (36) can be diverted to a disposal pile (38) which will allow an additional separating step.

Main or primary chamber (26) is provided with liquid level sensing means (24) which depends from one side or cover of separator (21). The sensing means extends downwardly into the contained emulsion and is adapted to provide a signal either mechanical or electrical in recognition of the level to which the liquid within the separator has risen. The signal is preferably electrically or electronically generated to be transmitted to control valve (23) actuator (37), thereby to adjust valve opening and consequently to adjust the rate of flow of incoming emulsion to the primary separating chamber.

Functionally, the primary purpose of the emulsion system is to maintain the flow rate of emulsion entering separator (21) at a desired rate. This rate can be effectively handled without allowing separated hydrocarbon to be returned to the waters surrounding platform (10). Stability of the system to avoid overfilling or overloading of the separator main tank (21) is effected by the cooperative arrangement between the liquid level sensor (24) and the flow control valve (23).

Liquid level sensing gauge (24) is positioned in primary compartment (26) so that the sensed level of emulsion in the said separator section is continuously monitored. There are a number of monitor switches and valves appropriate to this function on the commercial market, any of which would have the capability to sense the emulsion height in separating compartment (26) and to transmit a continuous signal commensurate with that height.

Control valve (23) in response to receiving the transmitted signal will be adjusted by activator (37) to either open or to close, depending on the nature of the signal. Preferably, sensor (24) will operate within a range of values such that the separating operation can be sustained at peak efficiency while at a predetermined operating rate of production. When an emergency situation rises prompted by a sudden influx of rain water into separator (21), the condition will be immediately sensed by the liquid level sensor (24). The signal reflective of this condition will react to limit or prohibit further influx of emulsion into separator (21).

With the cut off of emulsion flow at valve (23), rain water and emulsion will back up into the drain system itself, including conductors (18) and (19), and continue to backup for so long as valve (23) remains in closed position. Should the closed condition persist while the flow of rain continues, the emulsion back up flow will be diverted into the closed secondary or holding tank (22).

It is understood that although modifications and variations of the invention can be made without departing from the spirit and scope thereof, only such limitations should be imposed as are indicated in the appended claims.

We claim:

1. In a systems arranged for collecting and separating an aqueous emulsion having a hydrocarbon component, said system having a main separating tank including a weir overflow primary chamber and a hydrocarbon catcher secondary chamber means by which the emulsion is gravity separated into discreet aqueous and hydrocarbon components, inlet means for introducing emulsion into said primary chamber of said main separating tank and discharge port means for draining the hydrocarbon component and aqueous component from said main separating tank, the improvement for avoiding overloading of the main separating tank with aqueous emulsion comprising:

collecting means for receiving drain off water from an offshore platform and directing said water via a holding tank and a liquid conductor to said inlet means into said primary chamber of said main separating tank;

control valve means in said liquid conductor to said inlet means adjustable to vary flow therethrough in response to a received signal;

liquid level sensing means in said primary chamber of said main separating tank for sensing liquid level therein and for generating a signal representative of liquid level and transmitting said signal to said control valve means for activating said control valve means to a closed position to discontinue flow of emulsion to the main separating tank in response to the level of aqueous emulsion in said primary chamber of said main separating tank achieving a maximum value and to an open position in response to said liquid level sensing means sensing an optimal level of emulsion in said primary chamber of said main separating tank.

2. In an offshore structure having at least one deck and being positioned at an offshore site effective to produce an aqueous emulsion which includes a hydrocarbon component, a system arranged for collecting and separating said aqueous emulsion comprising a main emulsion separating tank having a primary chamber and a secondary chamber in which the aqueous emulsion is separated by gravity overflow through a weir into said secondary chamber thereby separating the discrete aqueous and hydrocarbon components, inlet means for introducing said aqueous emulsion to said primary chamber of said main separating tank, the improvement therein for avoiding overloading of the main separating tank with said aqueous emulsion characterized by means for collecting said aqueous emulsion together with rainwater from said at least one deck and communicating said aqueous emulsion and rainwater to said inlet means of said main separating tank, said means for collecting rainwater having liquid conductor means disposed on the structure's respective decks, a holding tank communicated to said conductor means to receive rainwater therefrom, said holding tank having an outlet communicated via a control valve means with said primary chamber of said main separating tank;

said separating tank having a discharge port with flow control means in said discharge port operable to regulate the flow of hydrocarbon liquid from said separating tank;

said control valve means having a signal responsive valve actuator means for adjusting said control valve means to vary flow of the aqueous emulsion therethrough into said primary chamber of said main separating tank; and liquid level sensing means in said primary chamber of said main separating tank for sensing the level of emulsion therein, and for generating and transmitting a feedback control signal to said valve actuator means representative of the emulsion level in said primary chamber of said main separating tank whereby the emulsion level in said primary chamber of said main separating tank is not allowed to exceed a predetermined maximum value.

* * * * *